United States Patent

Jarret et al.

[15] 3,687,440
[45] Aug. 29, 1972

[54] ELASTOMER DAMPING SPRING

[72] Inventors: Jean Jarret, Fourqueux; Jacques Jarret, Le Vesinet, both of France

[73] Assignee: Societe D'Exploitation Des Ressorts Auto-Amortisseurs, Paris, France

[22] Filed: July 24, 1970

[21] Appl. No.: 58,064

[30] Foreign Application Priority Data

July 25, 1969 France..................6925562

[52] U.S. Cl ...........................267/141, 267/63
[51] Int. Cl. ............................................F16f 1/37
[58] Field of Search.........267/141, 153, 140, 182, 63

[56] References Cited

UNITED STATES PATENTS

| | | | |
|---|---|---|---|
| 2,800,321 | 7/1957 | Jarret et al................... | 267/63 |
| 3,037,764 | 6/1962 | Paulsen....................... | 267/63 |
| 3,201,111 | 8/1965 | Afton.......................... | 267/153 |

*Primary Examiner*—James B. Marbert
*Attorney*—Marn & Jangarathis

[57] ABSTRACT

A damping spring comprising an elastomer composition received in a deformable enclosure. The spring comprises an enclosure embodied by annular elements 1, 1' which are placed one above another and which have a thin flexible outer part 1a and a rigid thick central part 2 whose edge bears on the substantially linear surface of a plug B, B' or of an intermediate disc 3 on which it can oscillate.

3 Claims, 3 Drawing Figures

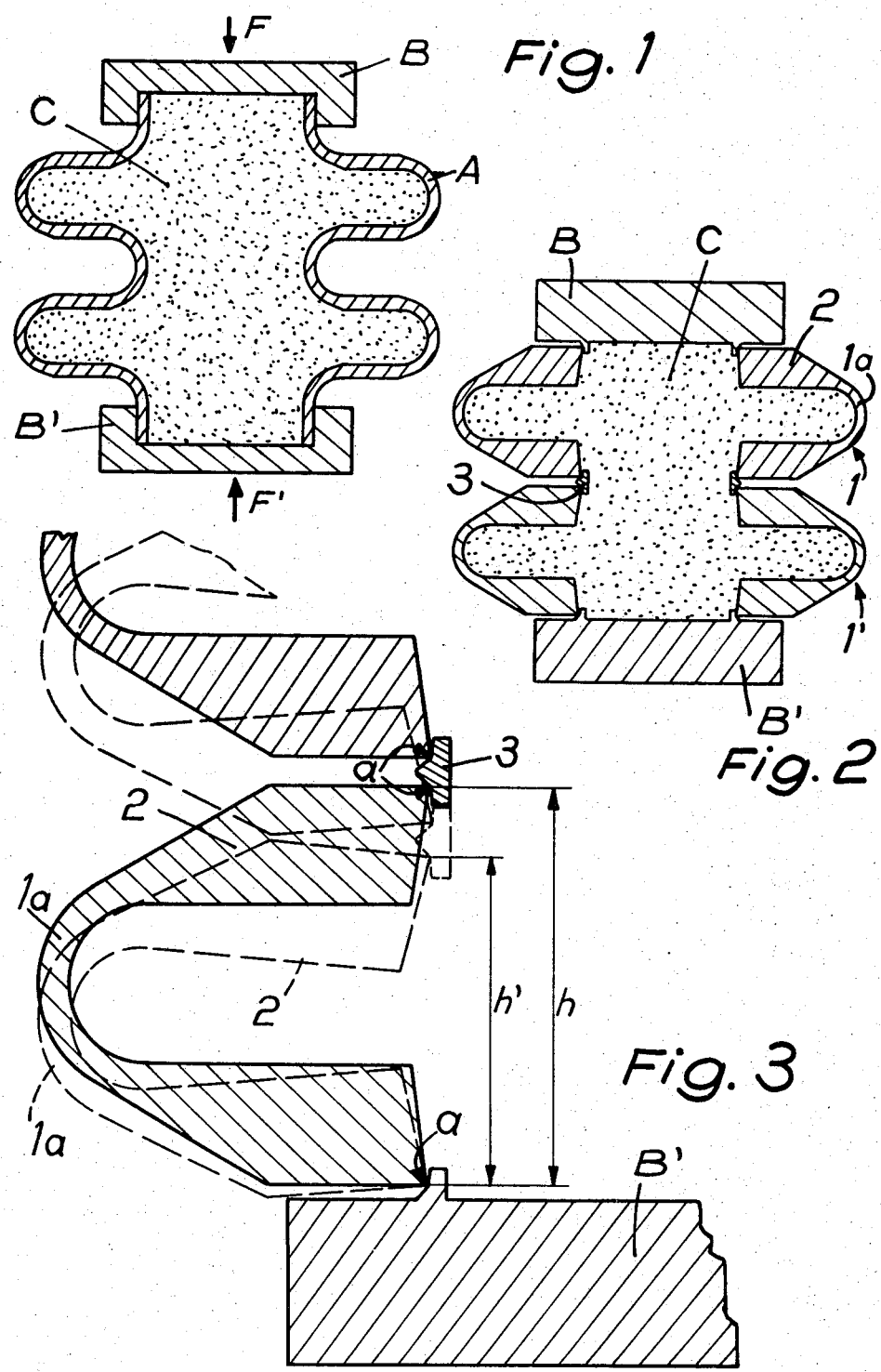

ELASTOMER DAMPING SPRING

Springs, including self-damping springs, can of course be embodied by an elastomer composition filling up the entire interior capacity of a deformable variable-volume casing; when externally applied forces reduce the casing volume, and therefore the volume of the elastomer composition, the internal pressure increases, opposes the deformation resiliently and, upon cessation of the external forces, restores the casing to its original volume.

More particularly, U.S. Pat. No. 2,800,321 discloses a spring of the kind specified wherein the deformable hermetic casing is an accordion-shaped enclosure of revolution which is closed at both ends by rigid plugs and which tends to be flattened by axial pressures applied to the plugs.

The amount of mechanical energy accumulated in such a spring based on hydrostatic compression of an elastomer is in a first approximation proportional to the square of the pressure. Advantageously, therefore, the pressure is increased as much as possible and the casing is so devised as to remain sufficiently resiliently deformable in the direction in which the external forces are applied, such forces being balanced mainly by the pressure of the elastomer.

If the deformable wall of the casing, in the form of a surface of revolution, is, as in the specification mentioned, embodied by a material having given mechanical characteristics, such as a steel having a given modulus of elasticity and elastic limit, the main factor governing the maximum internal pressure of the elastomer is the ratio between its cross-section and the total cross-section of the deformable wall bounding the elastomer cross-section. Advantageously, therefore, the mean thickness of the deformable wall is increased to the greatest possible extent without impairment of its ability to undergo large deformations in the direction of the external forces. This state of affairs is not always feasible with a spring such as disclosed by U.S. Pat. No. 2,800,321.

French Pat. No. 1,201,668 suggests springs wherein an elastomer is received in a variable-volume casing in the form of a cylinder filled with elastomer experiencing the pressure of a piston movable in the cylinder. Unfortunately, sealing a spring of this kind presents great difficulties, for at high pressures the compressed elastomer tends to behave like a liquid.

This invention relates to a novel kind of spring comprising an elastomer received in a variable-volume casing, the invention obviating the disadvantages of each of the two known kinds of spring; the invention suggests, in an enclosure whose general shape is similar to the enclosure of U.S. Pat. No. 2,800,321 limiting the change in capacity by deformation of the ring elements forming the bellows to those whose wall is in tension — i.e., to those disposed on the periphery of the accordion-shaped enclosure — the enclosure being embodied by a number of elements articulated to one another. Consequently, the enclosure is deformed not only by pleating but also by the articulation between any two of the consecutive elements forming the enclosure.

Since this deformation arising from articulation occurs only in the internal bellows parts which are always in compression, such parts can be thicker than the outside parts, with the result that the mean thickness of the enclosure is increased, so that as described in the foregoing, the internal pressure of the elastomer can be very high.

The articulation can be embodied just by contact between two very thin surfaces resembling an ordinary line, for though it may be difficult to maintain sealing-tightness between two rubbing surfaces such as are used in French Pat. No. 1,201,668, sealing-tightness is no problem in the case of two substantially linear static surfaces, since in this case the pressure of the elastomer which may cause a leak is always very much less than the pressure of the metal in the zone of the substantially linear contacting surfaces.

For a better understand of the invention, reference should be made to the accompanying drawings wherein:

FIG. 1 is a view in vertical section pro memoria of an elastomer spring of the kind disclosed in U.S. Pat No. 2,800,321;

FIG. 2 shows a spring according to this invention, and

FIG. 3 is a view to an enlarged scale of the bottom part of the spring shown in FIG. 1.

FIG. 1 shows a known kind of spring embodied by an accordion-shaped enclosure A closed at its top end and bottom end by non-yielding plugs, B, B' on which the forces to be balanced by the spring are applied in directions indicated by arrows F, F'. The resulting completely closed enclosure is filled right up with an elastomer composition C.

Referring to FIG. 2, which is an exemplary view of a spring according to this invention, the enclosure A takes the form of a number of elements 1, 1' and so on which are placed one above another and which can oscillate relatively to one another when pressures are applied to the plugs B, B'. As the drawing shows, the various elements 1, 1' and so on comprise two thick discoid parts 2 interconnected by a thin part 1a adapted to deform resiliently as in the device shown in FIG. 1.

Matters could be so arranged that any two consecutive elements 1, 1' could oscillate relatively to one another by way of the edge of the consecutive thick parts 2. Preferably, however, and as can be seen more clearly in the larger-scale view of FIG. 3, any two consecutive elements 1, 1' oscillate relatively to one another (between the solid-line position and the chain-line position) by way of a centring disc 3 which locates the casing elements relatively to one another and precludes the risk of any element sliding radially relative to the other, any two consecutive elements oscillating at a place $a$ by contact of the edge of the thick part 2 or 2' with an angular part of the disc 3.

As is more clearly apparent in FIG. 3, the effect of this relative oscillation between two consecutive elements 1, 1' is to alter the height $h$ of two consecutive elements when forces F, F' are applied via the plugs B, B', for as FIG. 3 shows clearly, the result of the relative oscillation produced by the forces F, F' is that the height $h$ becomes $h'$, so that the volume of the enclosure is reduced considerably.

The final elements 1, 1' can oscillate directly at a place $a'$ on a projection of the plugs B, B'. This volume reduction caused by the oscillation is cumulative with the volume reduction caused by the bending of the thin outer parts of each element.

The variable capacity according to the invention can of course have a number of consecutive oscillating elements of any kind and even have only just one single oscillating element relatively to the two plugs B, B'.

What we claim is:

1. A damping spring which is comprised of:
   a ring element having a thin flexible outer portion and thick rigid inner leg portions forming therein an elastomer receiving zone;
   an elastomer provided in said zone; and
   closure means including end plugs having a substantially linear surface, an end plug being provided for the leg portion of a ring element and contacts said leg portion at said linear surface to permit oscillation thereof.

2. The damping spring as defined in claim 1, wherein a plurality of ring elements are provided to oscillate relatively to one another.

3. The damping spring as defined in claim 2 wherein a centering disc is provided between two consecutive ring elements oscillating relative to one another, said disc having two ridges, each ridge containing an edge of a leg portion of said consecutive ring elements about a linear oscillation surface thereof.

* * * * *